(12) United States Patent
Zito et al.

(10) Patent No.: US 12,133,615 B2
(45) Date of Patent: Nov. 5, 2024

(54) TRANSPORTABLE ROBOTIC-AUTOMATED KITCHEN WORKCELL

(71) Applicant: Miso Robotics, Inc., Pasadena, CA (US)

(72) Inventors: David Zito, Pasadena, CA (US); Robert Anderson, Pasadena, CA (US); Ryan W. Sinnet, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 928 days.

(21) Appl. No.: 16/938,964

(22) Filed: Jul. 25, 2020

(65) Prior Publication Data

US 2021/0022559 A1    Jan. 28, 2021

Related U.S. Application Data

(60) Provisional application No. 62/879,371, filed on Jul. 26, 2019.

(51) Int. Cl.
*A47J 44/00* (2006.01)
*A47J 47/14* (2006.01)
(Continued)

(52) U.S. Cl.
CPC .............. *A47J 44/00* (2013.01); *A47J 47/14* (2013.01); *B25J 9/1697* (2013.01); *B25J 11/008* (2013.01)

(58) Field of Classification Search
CPC . A47J 44/00; A47J 47/14; B25J 11/008; B25J 9/1697
(Continued)

(56) References Cited

U.S. PATENT DOCUMENTS 2,658,444 A    11/1953  Wheeler
4,015,494 A    4/1977   Spooner et al.
(Continued)

FOREIGN PATENT DOCUMENTS

DE    202014001807 U1    3/2014
EP    1324865        *   7/2003
(Continued)

OTHER PUBLICATIONS

B. Siciliano & O. Khatib, Handbook of Robotics, published by Springer-Verlag Berlin (2008).
(Continued)

*Primary Examiner* — Dana Ross
*Assistant Examiner* — Joseph W Iskra
(74) *Attorney, Agent, or Firm* — Batt IP A Law Corporation; Richard Batt

(57) ABSTRACT

A transportable kitchen workcell includes a prefabricated enclosure, a robotic arm secured within the enclosure, one or more food appliances, a food prep area and storage, a sensor assembly, and a processor operable to command the robotic arm to autonomously prepare a completed entree from a wide variety of raw ingredients. A dispensing unit is arranged in the enclosure for dispensing the raw ingredients onto a target surface according to a selected flowrate and based on real time feedback measured during dispensing. The workcell is self-contained and is adapted to be conveniently moved (e.g., towed) to a new location. A wide range of entrees may be completed without rearranging or retooling the equipment in the workcell. New food items may be prepared by the workcell by simply selecting the applicable program, or by downloading an update corresponding to the new food item.

12 Claims, 10 Drawing Sheets

(51) Int. Cl.
  *B25J 9/16* (2006.01)
  *B25J 11/00* (2006.01)

(58) Field of Classification Search
  USPC .................................................. 99/443 R
  See application file for complete search history.

(56) References Cited

U.S. PATENT DOCUMENTS

| | | | |
|---|---|---|---|
| 4,052,319 A | 10/1977 | Friedman | |
| 4,545,723 A | 10/1985 | Clark | |
| 4,853,771 A | 8/1989 | Witriol et al. | |
| 4,919,950 A | 4/1990 | Mak | |
| 4,922,435 A | 5/1990 | Cahlander et al. | |
| 5,132,914 A | 7/1992 | Cahlander et al. | |
| 5,285,604 A | 2/1994 | Carlin | |
| 5,386,762 A | 2/1995 | Gokey | |
| 5,389,764 A | 2/1995 | Nishii et al. | |
| 5,458,384 A | 10/1995 | Liu et al. | |
| 5,466,025 A | 11/1995 | Mee | |
| 5,833,295 A | 11/1998 | Farlow, Jr. | |
| 5,893,051 A | 4/1999 | Tomohiro | |
| D412,642 S | 8/1999 | King | |
| D492,112 S | 6/2004 | Hardy | |
| 7,174,830 B1 | 2/2007 | Dong | |
| 7,383,963 B2 | 6/2008 | Svabek et al. | |
| 7,920,962 B2 | 4/2011 | D et al. | |
| 7,971,450 B2 | 7/2011 | Furlanetto et al. | |
| 8,276,505 B2 | 10/2012 | Buehler | |
| 8,610,037 B2 | 12/2013 | Polt | |
| D702,084 S | 4/2014 | Matos | |
| 8,820,313 B1 | 9/2014 | Lutes | |
| 9,220,371 B1 | 12/2015 | Demirakos et al. | |
| 9,233,470 B1 | 1/2016 | Bradski et al. | |
| 9,285,589 B2 | 3/2016 | Osterhout et al. | |
| 9,483,875 B2 | 11/2016 | Theimer et al. | |
| 9,538,880 B2 | 1/2017 | Riefenstein | |
| 9,542,621 B2 | 1/2017 | He et al. | |
| 9,785,911 B2 | 10/2017 | Galluzzo et al. | |
| 9,815,191 B2 | 11/2017 | Oleynik et al. | |
| 10,005,184 B2 | 6/2018 | Gerio et al. | |
| D825,266 S | 8/2018 | Iorio et al. | |
| 10,112,771 B2 | 10/2018 | D'andrea et al. | |
| 10,154,756 B2 | 12/2018 | Hall et al. | |
| 10,293,488 B2 | 5/2019 | Hall et al. | |
| 10,682,765 B2 | 6/2020 | Mirkhaef et al. | |
| 10,919,144 B2 | 2/2021 | Sinnet et al. | |
| 11,167,421 B2 | 11/2021 | Sinnet | |
| 11,351,673 B2 | 6/2022 | Zito et al. | |
| 11,518,044 B2 | 12/2022 | Liu et al. | |
| 11,577,401 B2 | 2/2023 | Sinnet et al. | |
| 2002/0028127 A1 | 3/2002 | Hart et al. | |
| 2002/0082924 A1 | 6/2002 | Koether | |
| 2004/0011321 A1 | 1/2004 | Hawaj | |
| 2004/0111321 A1 | 6/2004 | Kargman | |
| 2004/0154474 A1 | 8/2004 | Chan | |
| 2004/0172380 A1 | 9/2004 | Zhang et al. | |
| 2005/0036668 A1 | 2/2005 | McLennan et al. | |
| 2005/0049940 A1 | 3/2005 | Tengler et al. | |
| 2005/0193901 A1 | 9/2005 | Buehler | |
| 2006/0278216 A1 | 12/2006 | Gagas et al. | |
| 2007/0122000 A1 | 5/2007 | Venetianer et al. | |
| 2008/0110347 A1 | 5/2008 | Wong | |
| 2009/0192921 A1 | 7/2009 | Hicks | |
| 2009/0210090 A1 | 8/2009 | Takemitsu et al. | |
| 2009/0262206 A1 | 10/2009 | Park | |
| 2010/0132692 A1 | 6/2010 | Shaffer | |
| 2010/0182136 A1 | 7/2010 | Pryor | |
| 2010/0296903 A1 | 11/2010 | Shah et al. | |
| 2011/0153614 A1 | 6/2011 | Solomon | |
| 2011/0264266 A1 | 10/2011 | Kock | |
| 2012/0024170 A1 | 2/2012 | Fritz-Jung et al. | |
| 2013/0033057 A1 | 2/2013 | Markham | |
| 2013/0275236 A1 | 10/2013 | Koke et al. | |
| 2013/0302483 A1 | 11/2013 | Riefenstein | |
| 2014/0031978 A1 | 1/2014 | Takata | |
| 2014/0062112 A1 | 3/2014 | Cho | |
| 2014/0089299 A1 | 3/2014 | Kamei et al. | |
| 2014/0157698 A1 | 6/2014 | Cihak et al. | |
| 2014/0184496 A1 | 7/2014 | Gribetz et al. | |
| 2014/0203012 A1 | 7/2014 | Corona et al. | |
| 2014/0234066 A1 | 8/2014 | Mathi et al. | |
| 2014/0324607 A1 | 10/2014 | Frehn et al. | |
| 2014/0334691 A1 | 11/2014 | Cho et al. | |
| 2014/0351068 A1 | 11/2014 | Renfroe | |
| 2014/0363266 A1 | 12/2014 | Cooper | |
| 2015/0019354 A1 | 1/2015 | Chan et al. | |
| 2015/0290795 A1 | 10/2015 | Oleynik | |
| 2015/0310624 A1 | 10/2015 | Bulan et al. | |
| 2016/0037958 A1 | 2/2016 | Freymiller et al. | |
| 2016/0078694 A1 | 3/2016 | Swift | |
| 2016/0180546 A1 | 6/2016 | Kim et al. | |
| 2016/0239705 A1 | 8/2016 | Masood et al. | |
| 2016/0293470 A1 | 10/2016 | Oremus et al. | |
| 2016/0307459 A1 | 10/2016 | Chestnut et al. | |
| 2016/0327279 A1 | 11/2016 | Bhogal et al. | |
| 2016/0327281 A1 | 11/2016 | Bhogal et al. | |
| 2016/0334799 A1 | 11/2016 | D'Andrea et al. | |
| 2017/0011319 A1 | 1/2017 | Elliot et al. | |
| 2017/0024789 A1 | 1/2017 | Frehn et al. | |
| 2017/0030515 A1 | 2/2017 | Johnson et al. | |
| 2017/0116661 A1 | 4/2017 | Sundaram | |
| 2017/0130968 A1 | 5/2017 | Nagraj et al. | |
| 2017/0154803 A1 | 6/2017 | Wang et al. | |
| 2017/0169315 A1 | 6/2017 | Vaca Castano et al. | |
| 2017/0178070 A1 | 6/2017 | Wang et al. | |
| 2017/0206431 A1 | 7/2017 | Sun et al. | |
| 2017/0252922 A1 | 9/2017 | Levine et al. | |
| 2017/0290345 A1 | 10/2017 | Garden et al. | |
| 2017/0305015 A1 | 10/2017 | Krasny et al. | |
| 2017/0348854 A1 | 12/2017 | Oleynik | |
| 2017/0364073 A1 | 12/2017 | Guy | |
| 2018/0150661 A1 | 5/2018 | Hall et al. | |
| 2018/0339463 A1 | 11/2018 | Stone et al. | |
| 2018/0345485 A1 | 12/2018 | Sinnet et al. | |
| 2018/0365630 A1 | 12/2018 | Seals et al. | |
| 2019/0256301 A1 | 8/2019 | Hashimoto et al. | |
| 2019/0297899 A1 | 10/2019 | Weiss | |
| 2019/0352028 A1 | 11/2019 | Mirkhaef et al. | |
| 2019/0389082 A1 | 12/2019 | Higo | |
| 2020/0009638 A1 | 1/2020 | Asada et al. | |
| 2020/0030966 A1 | 1/2020 | Hasegawa et al. | |
| 2020/0046168 A1 | 2/2020 | Sinnet et al. | |
| 2020/0047349 A1 | 2/2020 | Sinnet et al. | |
| 2020/0054175 A1 | 2/2020 | Roy et al. | |
| 2020/0087069 A1 | 3/2020 | Johnson et al. | |
| 2020/0121125 A1 | 4/2020 | Zito et al. | |
| 2020/0238534 A1 | 7/2020 | Goldberg et al. | |
| 2020/0254641 A1 | 8/2020 | Hocker et al. | |
| 2021/0030199 A1 | 2/2021 | Olson et al. | |
| 2021/0038025 A1 | 2/2021 | Almblad | |
| 2021/0094188 A1 | 4/2021 | Rodionov et al. | |
| 2021/0107724 A1 | 4/2021 | Cohen | |
| 2021/0196081 A1 | 7/2021 | Kodali et al. | |
| 2021/0208171 A1 | 7/2021 | Guarracina et al. | |
| 2021/0276756 A1 | 9/2021 | Dunkel | |
| 2021/0394371 A1 | 12/2021 | Ishizu et al. | |
| 2022/0055225 A1 | 2/2022 | Sinnet et al. | |
| 2022/0324119 A1 | 10/2022 | Kodali et al. | |
| 2022/0346598 A1 | 11/2022 | Sinnet et al. | |

FOREIGN PATENT DOCUMENTS

| | | | |
|---|---|---|---|
| FR | 2578717 | * | 9/1986 |
| GB | 2547286 A | | 8/2017 |
| JP | 2004062750 A | | 2/2004 |
| JP | 2008296308 A | | 12/2008 |
| JP | 2009106734 A | | 5/2009 |
| JP | 2009297880 A | | 12/2009 |
| JP | 4655912 B2 | | 3/2011 |
| JP | 5814305 B2 | | 11/2015 |
| WO | 0170087 A2 | | 9/2001 |
| WO | 2006006624 A1 | | 1/2006 |
| WO | 2012020858 A1 | | 2/2012 |
| WO | 2015100958 A1 | | 7/2015 |

(56) References Cited

FOREIGN PATENT DOCUMENTS

| WO | 2015143800 A1 | 10/2015 |
| WO | 2016040361 A1 | 3/2016 |
| WO | 2015125017 A3 | 6/2016 |
| WO | 2016140622 A1 | 9/2016 |
| WO | 2017114014 A1 | 7/2017 |
| WO | 2017103682 A3 | 8/2017 |
| WO | 2018031489 A1 | 2/2018 |
| WO | 2018165105 A1 | 9/2018 |
| WO | 2019079345 A1 | 4/2019 |
| WO | 2022256799 A1 | 12/2022 |

OTHER PUBLICATIONS

Beucher, Serge, and Fernand Meyer. "The morphological approach to segmentation: the watershed transformation." Optical Engineering—New York—Marcel Dekker Incorporated—34 (1992): 433-433.

Bonanni et al., "Counterintelligence: Augmented Reality Kitchen", CHI 2005, (Apr. 2, 2005), URL: http://citeseerx.ist.psu.edu/viewdoc/summary?doi=10.1.1.88.2875, (Jun. 12, 2018), XP055559956.

Goodfellow et al., Generative adversarial networks, Communications of the ACM, vol. 63, Issue 11, Nov. 2020 pp. 139-144.

International Preliminary Examination Report dated Jul. 20, 2018 for PCT/US2018/021066.

International Search Report and Written Opinion of ISA dated Aug. 17, 2022 for PCT/US2022/072666.

International Search Report and Written Opinion of ISA dated Jul. 11, 2018 for PCT/US2018/020948.

International Search Report and Written Opinion of ISA of PCT application No. PCT/US2022/071871 dated Sep. 1, 2022.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/...017/03/02/57c95fb0-f55a-11e6-b9c9-e83fce42fb61_story.html?horedirect=on&utm_term=.108e357d67df, (May 21, 2018).

Lin, Tsung-Yi, et al. "Focal loss for dense object detection." Proceedings of the IEEE international conference on computer vision. 2017.

Lucas, Bruce D., and Takeo Kanade. "An iterative image registration technique with an application to stereo vision." (1981): 674-679.

Ohta, Yu-Ichi, Takeo Kanade, and Toshiyuki Sakai. "Color information for region segmentation." Computer graphics and image processing 13.3 (1980): 222-241.

Paul Viola, et al., Rapid Object Detection using a Boosted Cascade of Simple Features, Accepted Conference on Computer Vision and Pattern Recognition 2001 (https://www.cs.cmu.edu/~efros/courses/LBMV07/Papers/viola-cvpr-01.pdf).

Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

Simon, Dan. "Kalman filtering." Embedded systems programming 14.6 (2001): 72-79.

Xiao-Shan Gao et al. "Complete solution classification for the perspective-three-point problem," in IEEE Transactions on Pattern Analysis and Machine Intelligence, vol. 25, No. 8, pp. 930-943, Aug. 2003.

\* cited by examiner

TRANSPORTABLE ROBOTIC-AUTOMATED KITCHEN WORKCELL

CROSS-REFERENCE TO RELATED APPLICATIONS

This claims priority to provisional application No. 62/879,371, filed Jul. 26, 2019, the entirety of which is incorporated by reference for all purposes.

BACKGROUND

This invention relates to automated kitchens for carrying out various food preparation tasks, and particularly, to modular or transportable robotic-automated kitchen workcells.

Although there has been some progress in automated-kitchen systems (e.g., vending machines and the like to serve hot beverages), the systems are limited to serving only a few types of food items. Should another type of food item be desired, the equipment must be substantially reconfigured, rearranged, or replaced. What is more, the footprint is often required to be enlarged or otherwise reshaped to accommodate the new type of food item. This is undesirable.

An improved automated kitchen system is desired that is capable of preparing a wide variety of food items, and that does not require a physical reconfiguration for each additional type of food item. This and other shortcomings are overcome by embodiments of the present invention, discussed herein.

SUMMARY OF THE INVENTION

A transportable robotic-automated kitchen workcell comprises a prefabricated enclosure comprising a floor, ceiling, side walls, a rear wall, and front wall. A robotic arm and kitchen appliance are secured inside the enclosure, and arranged such that the appliance is located within reach of the robotic arm.

Optionally, the workcell includes a plurality of kitchen utensils, each of which is located within reach of the robotic arm. In embodiments, the workcell includes a tool mount to hold each of the utensils, allowing the robotic arm to pick up and return a wide variety of different types of kitchen utensils.

The workcell additionally includes a raw food storage area for holding raw food ingredients; a food prep area; a plurality of hand-held sized serving vehicles; and a delivery storage area for placing completed entrees.

The workcell additionally includes a camera or sensor assembly aimed at the food prep area and a computer comprising a memory and programmed processor operable to instruct the robotic arm to automatically carry out one or more food preparation steps. The food preparation steps are determined by the processor and based on receiving an order from a customer and input from the camera or sensor assembly.

In embodiments, the computer is programmed to perform one or more of the following steps: collect the raw food ingredients from the raw food storage area; assemble the raw food ingredients in the food prep area into a precursor entrée; deliver the precursor entrée to the kitchen appliance to perform cooking; cook the precursor entrée into a completed entrée; transfer the completed entrée to one serving vehicle; and place the completed entrée into delivery storage area for customer pickup.

Optionally, the computer is operable to instruct the robotic arm to clean the food prep area by, for example, spraying the surfaces with water. In embodiments, the workcell includes an onboard water pump. The surfaces of the appliances and food prep areas are preferably arranged close together and without gaps where contaminants can collect.

In embodiments, at least one of the walls and front comprises a window, door, or opening. In embodiments, each side of the enclosure ranges from 4 to 10 ft. Optionally, the workcell comprises wheels rotatably mounted to the enclosure. Consequently, in embodiments, the workcell may be simply towed or driven to one or more locations.

In embodiments, the workcell further comprises a second robotic arm. Optionally, a linear guide is mounted in the enclosure and the robotic arms are movably arranged on the linear guide to carry out the steps recited herein.

In embodiments, the computer is operable to perform a quality check after assembling the precursor entrée and prior to cooking, and more preferably, to perform a quality check after cooking.

In embodiments, the workcell further comprises a wireless communication module in connection with the processor for receiving a customer order.

In embodiments, the workcell comprises an ingredient dispensing unit for dispensing ingredients to be used in the assembly step. The ingredient dispensing unit preferably has at least one sensor to measure a value associated with the ingredients as the ingredients are dispensed. In embodiments, the measured value is a mass of the ingredients at a time ($M_{ti}$).

In embodiments, the dispensing unit assembly further includes a mechanical actuator to control a rate at which the ingredients are dispensed (Q) based on $M_{ti}$.

Optionally, the mechanical actuator can be a vibrator device, and is coupled to a ramp which shakes in response to the vibrator device.

In embodiments, the dispensing unit assembly comprises multiple bins, at least one of which is refrigerated.

In embodiments, the robotic arm is adapted to place at least one topping on pizza dough during the assembly step, or optionally, to position and move the pizza dough under the dispensing unit for receiving the at least one topping on the pizza dough from the dispensing unit.

In embodiments, the robotic arm is adapted to pour and spread a sauce on a pizza dough during the assembling, or optionally, to position and move the pizza dough under the dispensing unit for receiving the sauce on the pizza dough.

In another embodiment of the invention, a dispensing unit assembly comprises a ramp, vibrating motor, and load cell arranged in cooperative engagement to deliver raw food ingredients to a target surface. In embodiments, the dispensing unit additionally includes a bin and a drum therein. The drum is controlled by a motor. A computer is operable to control the speed of the motor to eject the raw food from the bin onto the ramp, and also to control the vibrating motor to move the raw food along the ramp to the target surface. The processor can be programmed to adjust the flowrate of the raw food based on measuring certain values associated with the flow of food such as mass per time.

In another embodiment of the invention, a method for preparing a completed entrée at a first location remote from a food base station comprises delivering a robotic-automated kitchen workcell to the first location and preparing a completed entrée by the robotic arm in the workcell based on a customer order. The step of preparing comprises: collecting the raw ingredients from a raw storage area; assembling the raw ingredients in a food prep area into a precursor entrée;

delivering the precursor entrée to the kitchen appliance to cook; cooking the precursor entrée to a completed entrée; transferring the completed entrée to a hand-held sized serving vehicle; and placing the completed entrée into a delivery storage area for customer pickup.

The step of assembling may be performed by dispensing the raw ingredients based on a measurement sensed in real time. The dispensing can be performed by a dispensing unit comprising a bin and vibrating ramp.

In embodiments, the method further comprises moving the robotic-automated kitchen workcell to a second location remote from the food base station. Optionally, the step of moving may be performed by towing.

In embodiments, the second location can be determined automatically based on a demand prediction module.

In embodiments, the method further comprises tracking the location of the robotic-automated kitchen workcell.

In embodiments, the method further comprises cleaning the food prep area, wherein the step of cleaning is performed autonomously by the robotic arm in combination with a spray nozzle and onboard water supply/pump.

This and other features, objects and advantages of embodiments of the present invention will become apparent from the detailed description to follow, together with the accompanying drawings.

DETAILED DESCRIPTION OF THE INVENTION

Figure 1:
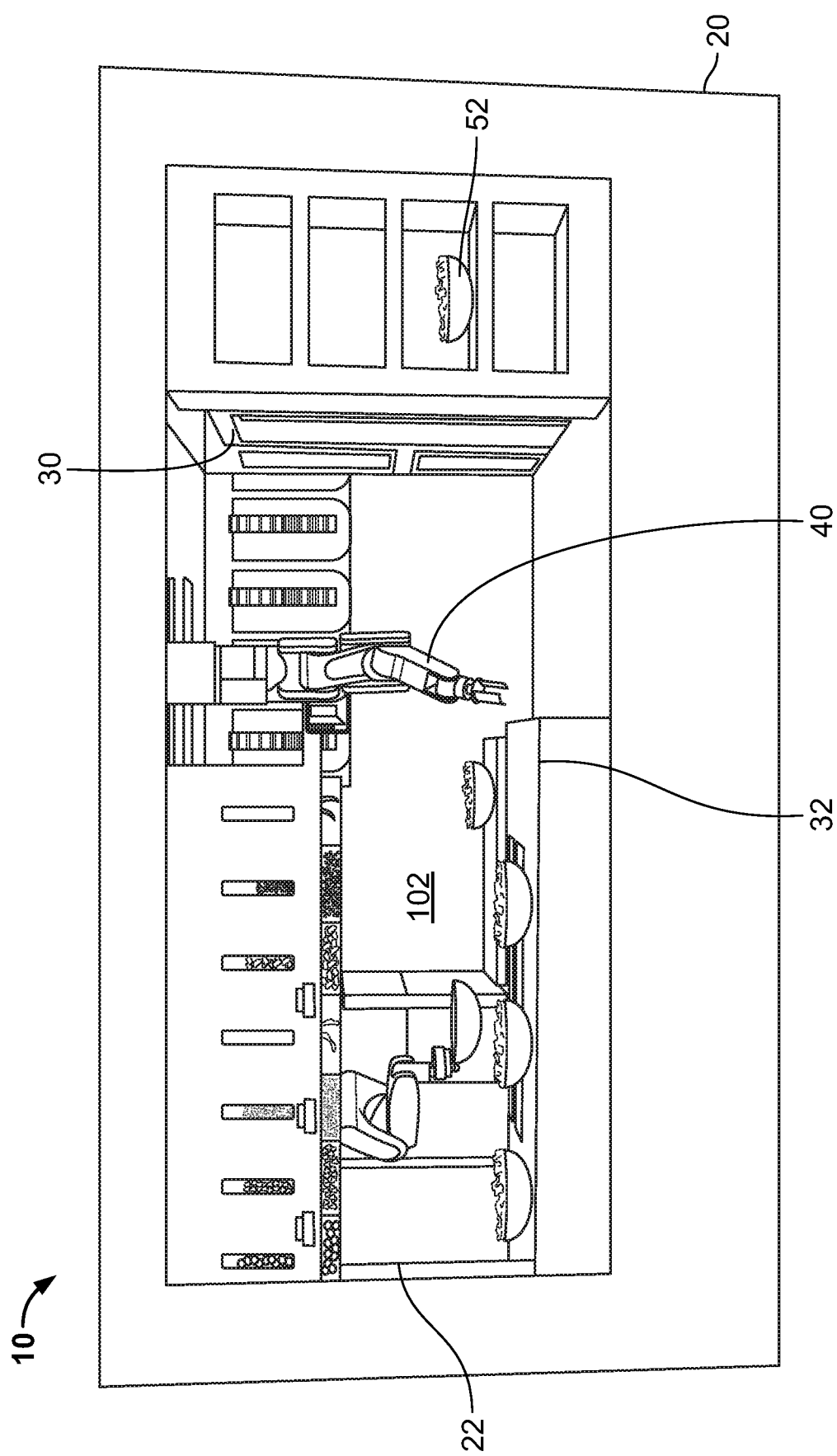
FIG. 1 is a front view of a robotic-automated kitchen in accordance with an embodiment of the invention.

It is to be understood that the embodiments of the invention described herein are not limited to particular variations set forth herein as various changes or modifications may be made to the embodiments of the invention described and equivalents may be substituted without departing from the spirit and scope of the embodiments of the invention. As will be apparent to those of skill in the art upon reading this disclosure, each of the individual embodiments described and illustrated herein has discrete components and features that may be readily separated from or combined with the features of any of the other several embodiments without departing from the scope or spirit of the embodiments of the present invention. In addition, many modifications may be made to adapt a particular situation, material, composition of matter, process, process act(s) or step(s) to the objective(s), spirit or scope of the embodiments of the present invention. All such modifications are intended to be within the scope of the claims made herein.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

It will also be understood that, although the terms first, second, etc. may be used herein to describe various elements, these elements should not be limited by these terms. These terms are only used to distinguish one element from another. Thus, a first element could be termed a second element without departing from the teachings of the present invention.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein except where such features are exclusive of one another. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

All existing subject matter mentioned herein (e.g., publications, patents, patent applications and hardware) is incorporated by reference herein in its entirety except insofar as the subject matter may conflict with that of the present invention (in which case what is present herein shall prevail).

Overview

With reference to FIG. 1, a robotic-automated kitchen 10 in accordance with an embodiment of the invention is shown. The robotic-automated kitchen includes a prefabricated enclosure 20, window 22, smart food storage area 30, food preparation area 32, robotic manipulation components 40, and a number of other components including, without limitation, sensors, a processor, memory storage, food processing equipment, cleaning components, and user interaction areas.

In embodiments, the automated robotic kitchen 10 is configured to cook different menu items with very little change to the components, arrangement of components, and overall footprint because of the versatility and flexibility of the manipulators/sensors and the configuration capabilities of the software controlling the system, discussed further herein. In a sense, the self-contained automated robotic kitchen is a kitchen in a box ("KIAB").

Economies of scale is achieved because the general design of the KIAB and its components are the same regardless of the menu items to be cooked. Particularly, in embodiments, the type and arrangement of the enclosure, manipulators, processor, prep (cook and assemble) areas, and sensors are the same regardless of the menu item to be cooked.

Figure 2:
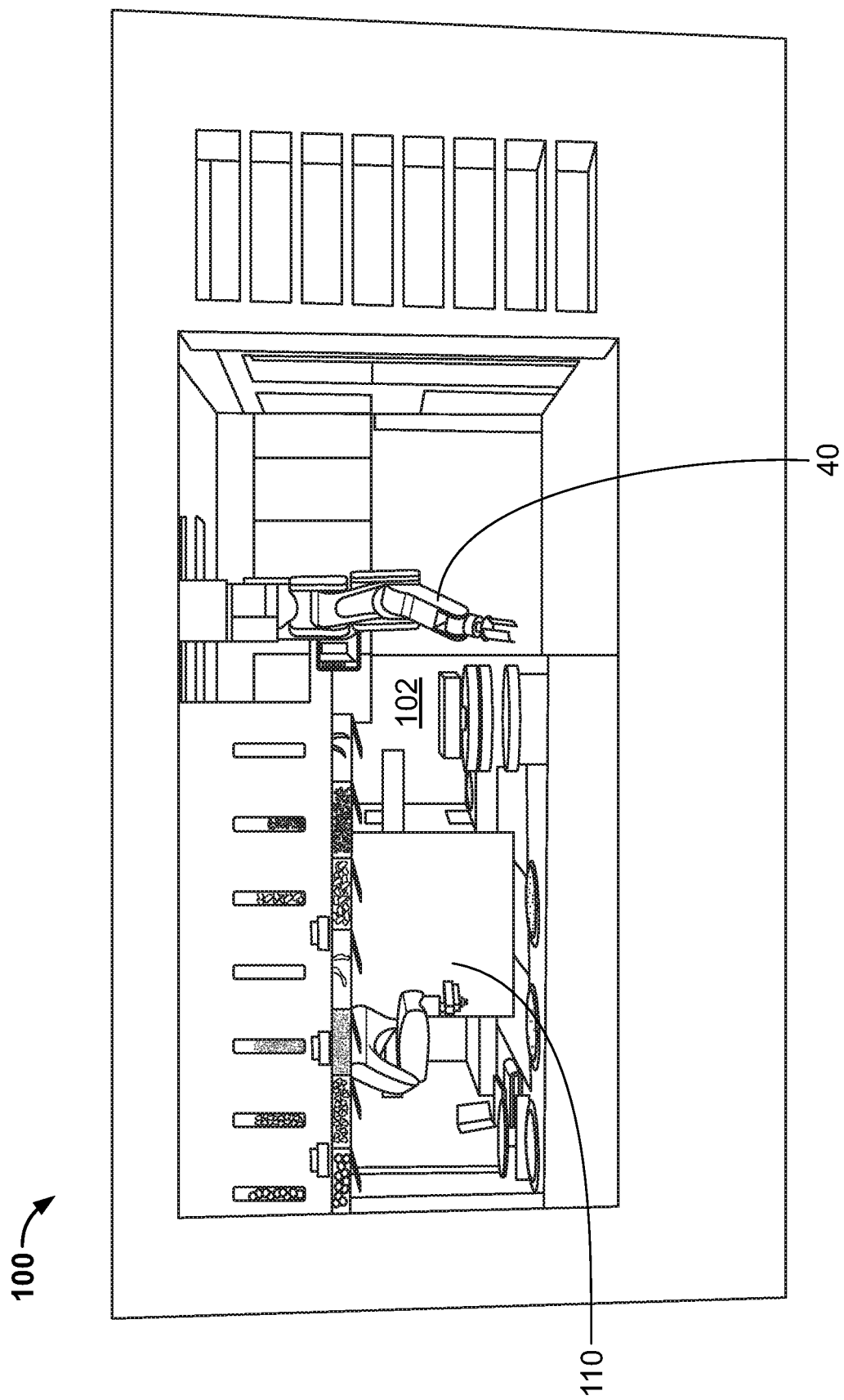
FIG. 2 is a front view of a robotic-automated kitchen in accordance with another embodiment of the invention.
Figure 3:
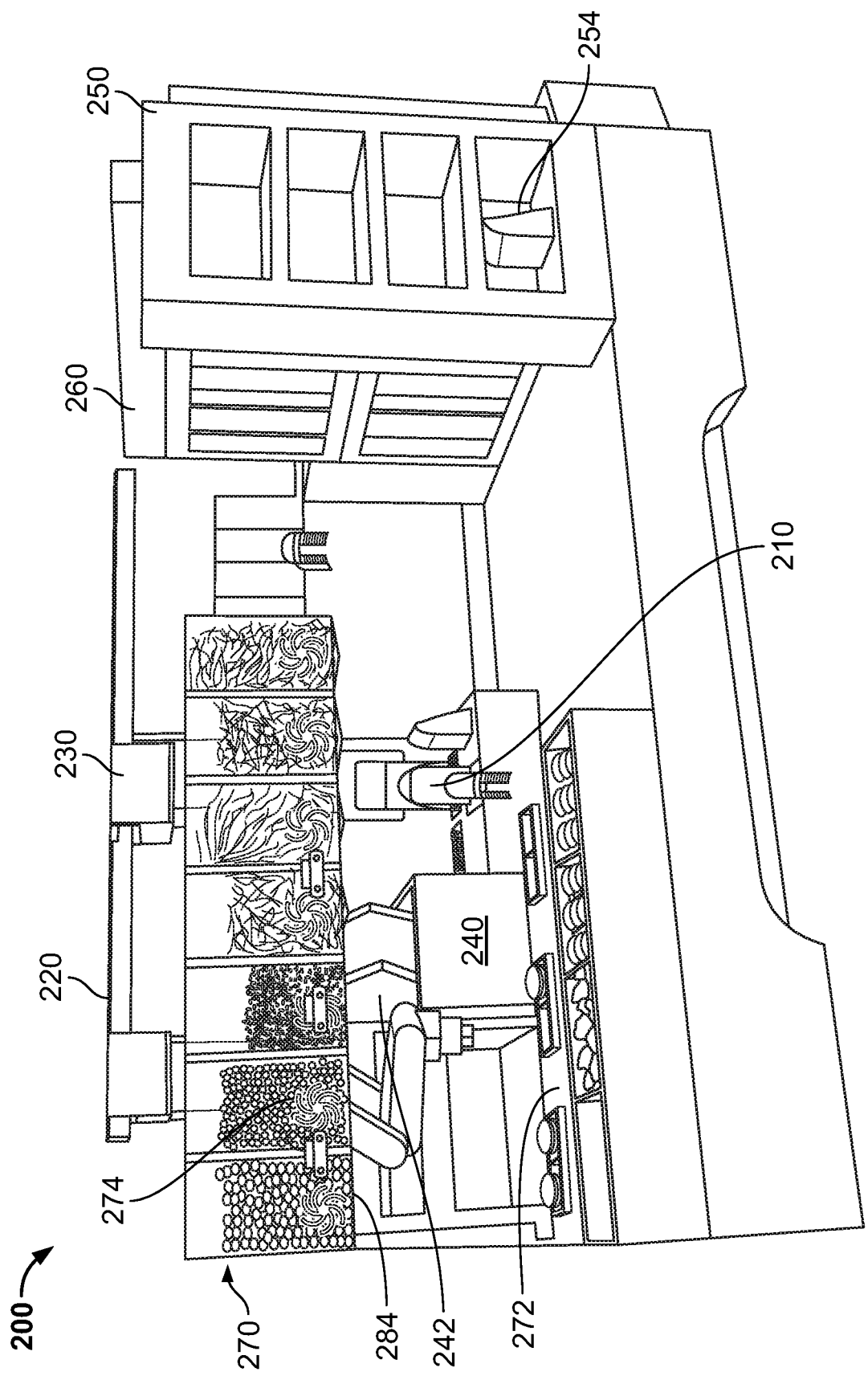
FIG. 3 is a front side perspective view of a robotic-automated kitchen in accordance with another embodiment of the invention.

With reference to FIG. 2, a KIAB 100 includes an appliance space 102 for accommodating a wide variety of kitchen equipment for the menu item such as, for example, pizza oven 110 shown in FIG. 2, or fryer 240 shown in FIG. 3. The appliance space is located within reach of the robotic arm, and preferably, a predetermined or fixed location and volume.

In view of the components, arrangement of the components, and enclosure provided in the KIAB, a whole new menu can be quickly prepared by modifying very few (perhaps none) of the components.

The food menu recipes can be defined and stored in a memory so the time to make a KIAB ready to prepare a whole new food item is relatively small compared to traditional automation methods which would require one to rework the hardware, arrangement of components and footprint of the kitchen space. What is more, the subject invention allows for high flexibility of ingredients and menus as operators may want to introduce promotional items for a limited time or switch food suppliers. This approach allows for economies of scale of most parts of the system and increases the ability of operators to scale to new markets without needing to deal with the complexities of opening up new brick and mortar stores.

With reference to FIG. 3, an exemplary configuration of a KIAB 200 is shown for cooking burgers and fries. In the KIAB shown in FIG. 3, the enclosure has been removed for clarity to show manipulator 210, linear guide system 220/230, fryer 240 and fry baskets 242, pickup area 250 for the completed bagged food items 254, smart storage 260, and food dispense unit 270 comprising a plurality of bins.

Linear Guide System

The robotic arm 210 is shown coupled to upper guide rail 220 via movable base carriage 230. The carriage and guide cooperate together to axially move the robotic arm along the guide when commanded to do so by the processor described herein.

The linear actuator is shown located on the ceiling and not directly above any food preparation surfaces. Positioning the linear actuator in the vicinity of the 'splash-zone' desirably avoids more complicated and restrictive food regulations. However, it is to be understood that the linear actuator may located elsewhere in the enclosure. In other embodiments, a guide system may extend from the front towards the back (or from the top to bottom) of the workcell. In addition to such axial motion, the robot manipulator itself enjoys several other degrees of motion (multi-axis) as described further herein.

The linear movement may be generated using a number of different linear movement systems. In embodiments, the KIAB utilizes a cleanable linear actuator design 220 to extend the reach of one or more manipulators 210. In one embodiment, the linear actuator is composed of a ball screw mechanism with thread and pitch size large enough to easily clean between the threads.

Additionally, the linear actuator may be covered to protect it. In embodiments, a barrier is shaped to cover the sliding mechanisms from any splashes from food production. A cover allows access of the carriage 230 to move freely along the rail 220.

Dispensing Unit

In embodiments, the food dispense unit 270 is located above the food prep or food assemble area 272 such that ingredients may be gravity fed from the bins to the food item to be assembled. In embodiments, each bin comprises a lower exit aperture for the ingredient delivery. An optional drum 274 controls the output of the ingredients from the exit aperture to the target surface located below the aperture. Preferably, the exit aperture and drum are adjustably controllable to fine tune the ingredient delivery from the bins. Additionally, cameras or other types of sensors can be incorporated into the bins to monitor bin ingredient inventory and feed throughput or flowrate through the exit aperture. Bins may be refilled in place from a top opening or window, or each bin may be wholly replaced with an entire bin full of fresh ingredients based on timing or inventory levels.

Figure 4:
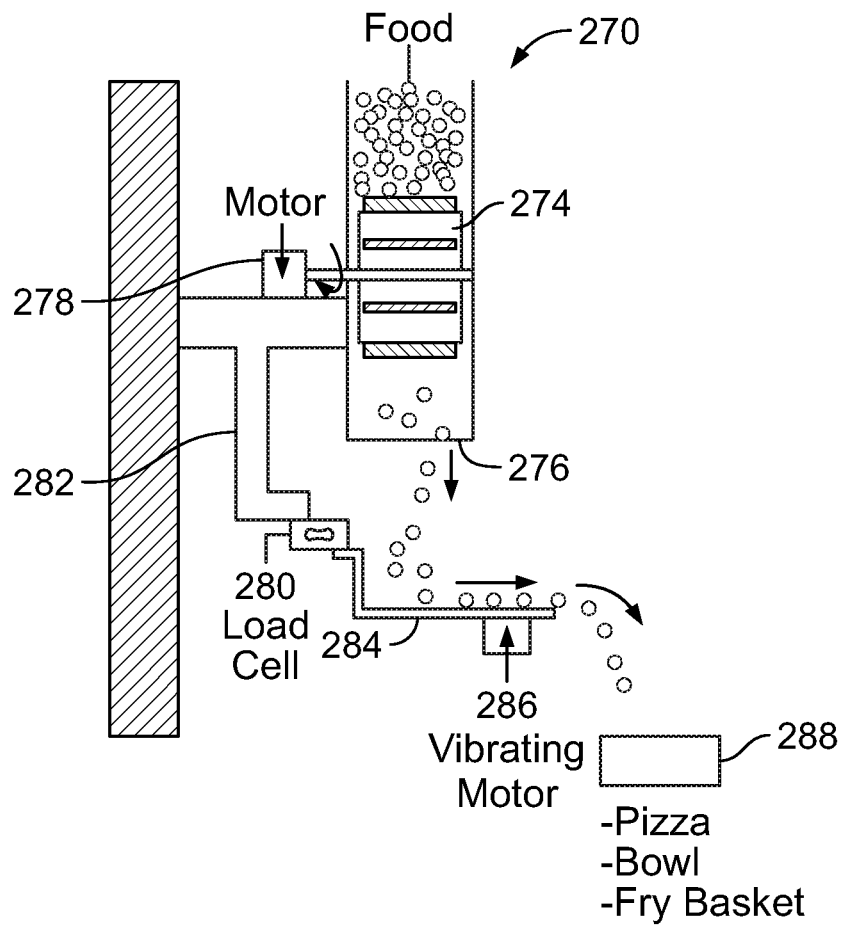
FIG. 4 is a schematic illustration of an individual dispensing assembly in accordance with an embodiment of the invention.

FIG. 4 shows a side view of a schematic illustration of an individual dispensing bin for use with a KIAB in accordance with another embodiment of the invention. The dispensing bin 270 shown in FIG. 4 is a smart dispensing bin because it includes sensors and a feedback loop to control flowrate of the ingredients from the bin. As shown, bin 270 includes a drum 274 controllably rotatable by drive motor 278 to permit a controlled (e.g., pre-set, known, target, or given) amount of ingredients to flow through the exit aperture 276 and to fall onto ramp 284. Ramp 284 is coupled to agitator or vibrating motor 286 to vibrate, urging the food ingredients to fall off the ramp and onto the target surface 288 (e.g., a pizza crust, bowl, or fry basket).

A load cell 280 is coupled to the ramp 284 to measure the mass of food on the ramp over time for computing the food delivery flowrate. The motors and load cell are coupled to the system's computer or another processor to monitor the flowrate and to adjust the motors such that the flowrate of the food ingredients to the target 288 is within a desired range according to the recipe for the menu item. Accordingly, the dispensing unit 270 can accommodate many different types of ingredients, toppings and food items without a need to physically retool or reconfigure the dispensing unit or KIAB footprint. Indeed, the processor may merely be reprogrammed for the particular menu item if the program is not already in storage memory.

Figure 5:
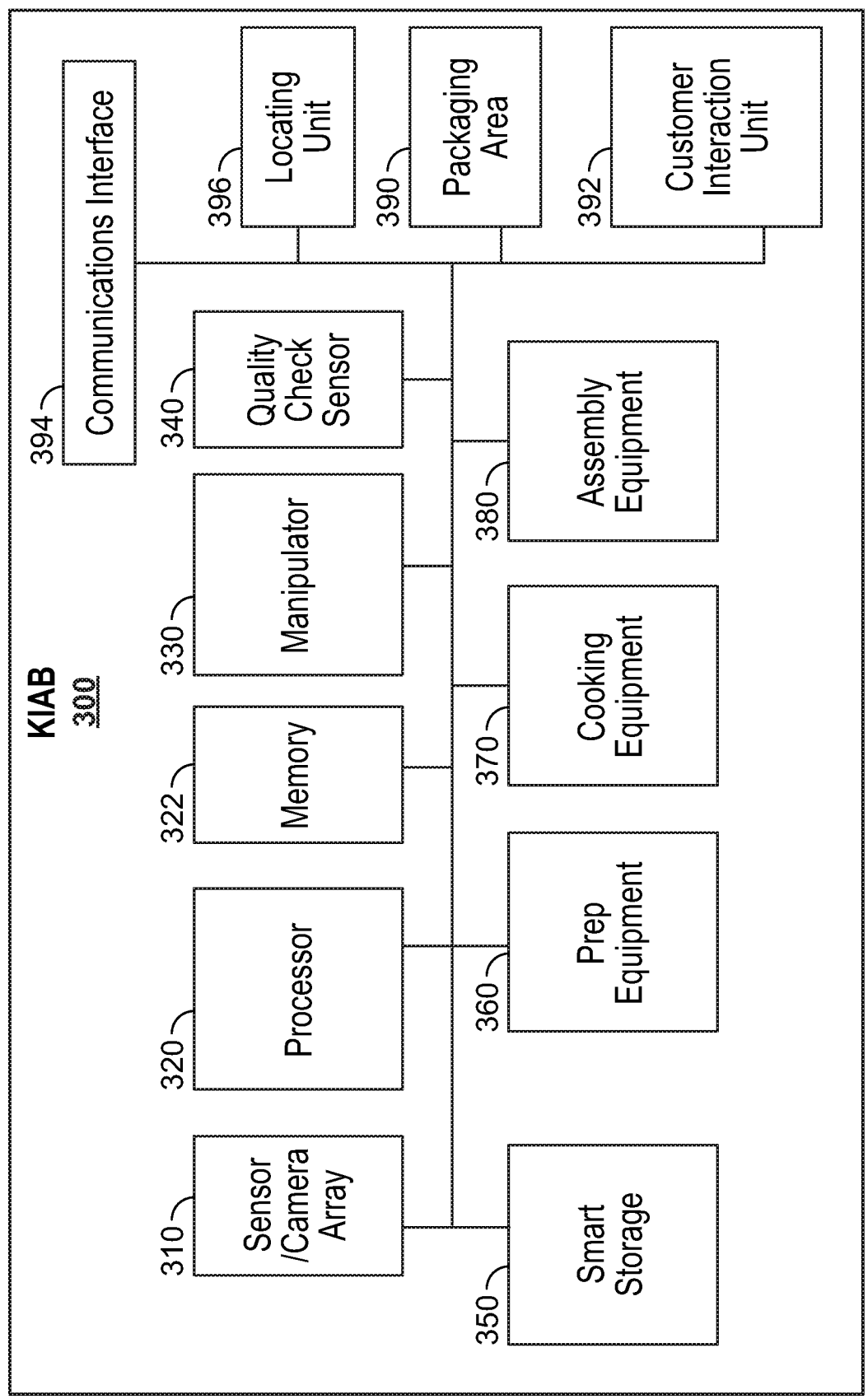
FIG. 5 is a block diagram of a system for preparing food items in accordance with an embodiment of the invention.

FIG. 5 is a block diagram illustrating various components of an embodiment of a KIAB 300 in accordance with the present invention. The KIAB 300 shown in FIG. 5 includes one or more sensors or cameras 310 for food recognition. A processor 320 is programmed to instruct a manipulator or robotic arm 330 to perform food cooking or preparation steps to cook menu items. Food quality, accuracy, or doneness is evaluated based on input from quality check sensor 340 in combination with the algorithms stored in memory (322) and performed on the processor.

Smart raw food storage 350 receives and holds raw food, cooked food, or food otherwise for use in cooking a menu item. The smart storage is "smart" because it detects levels of food inventory. As discussed further herein, the levels of food inventory are fed into a state of the system in order to meet demand and reorder raw ingredients, and to time cooking. A preferred smart storage is an insulated refrigerator-type cabinet including shelves, temperature sensors, and cameras.

Preparation equipment 360 is shown in the KIAB. Examples of preparation equipment are food preparation tables, mixers, slicers, choppers, and utensils associated therewith.

Cooking equipment 370 is shown in the KIAB. Examples of cooking equipment are fryers, grills, conveyors, and ovens.

Assembly equipment 380 is shown in the KIAB. Examples of assembly equipment include, without limitation, the smart dispensing unit 270 and bins described above, as well as hotel pans.

In embodiments, the assembly equipment 380 assembles raw food into a precursor entrée such as spreading sauce and placing toppings on a pizza dough. The precursor entrée (e.g., the assembled uncooked pizza) is then delivered to the cooking equipment to cook into a completed entrée (e.g., the uncooked pizza is placed on a conveyer that moves through a pizza oven).

The KIAB also includes a packaging area 390 to incorporate the completed menu items into packaging or handheld size serving vehicles for customer pickup. Examples of serving vehicles are, without limitation, salad bowls 52 as shown in FIG. 1, or the paper bags 254 as shown in FIG. 3. Indeed, a wide variety of serving vehicles may be applied in the invention. The serving vehicles are then placed in the customer pickup area.

Customer interaction unit 392 is shown in the KIAB of FIG. 5. In embodiments, orders may come in digitally through an app or a kiosk through the customer interaction unit 392 on the KIAB. Orders can be removed from the system by an automated pick up station by the consumer or a delivery person. In some embodiments, the agent delivering the food to the consumer is a robot and the pickup station is fully automated to accommodate the handoff such as, for example, the sled and robotic kitchen assistant systems described in U.S. Patent Publication No. 20190176338, filed Feb. 20, 2019, and entitled "ROBOTIC SLED-ENHANCED FOOD PREPARATION SYSTEM AND RELATED METHODS," incorporated herein by reference in its entirety. Orders are timed using the programmed processor scheduling module to be made for maximum freshness so that the meal is finished just before the consumer or delivery agent arrives to pick up the food.

In the embodiment shown in FIG. 5, a communications interface 394 is adapted to communicate information between the KIAB and a remote server whether via landline, wireless, or otherwise. As discussed further herein, the remote server may monitor demand and evaluate whether inventory is sufficient, and in some embodiments, whether to supply or remove an additional KIAB to or from a particular location (namely, street address, city, state). Optionally, the KIAB 300 includes a location unit 396 (e.g., GPS tracker) to compute the location of the KIAB.

It is to be understood that the KIAB may include a wide variety of components and arrangements of the components as described herein. Examples of components include, without limitation, sensors and cameras, manipulators and grippers, cooking equipment and utensils, and at least one programmed processor to carry out a wide range of food preparation processes, food location and recognition (e.g., a computer vision module), inventory estimate module, demand prediction module, schedule (e.g., a scheduling module) and system state computation (e.g., system state module). Examples of descriptions of the components and processes can be found in the following patents, each of which is incorporated by reference in its entirety: US Publication No. 20180345485, filed Aug. 10, 2018; US Publication No. 20190176338, filed Feb. 20, 2019; International Publication No. 2018165105, filed Mar. 6, 2018; and International Publication Nos 2018165038, filed Mar. 5, 2018.

Cooking Workflow

Figure 6:
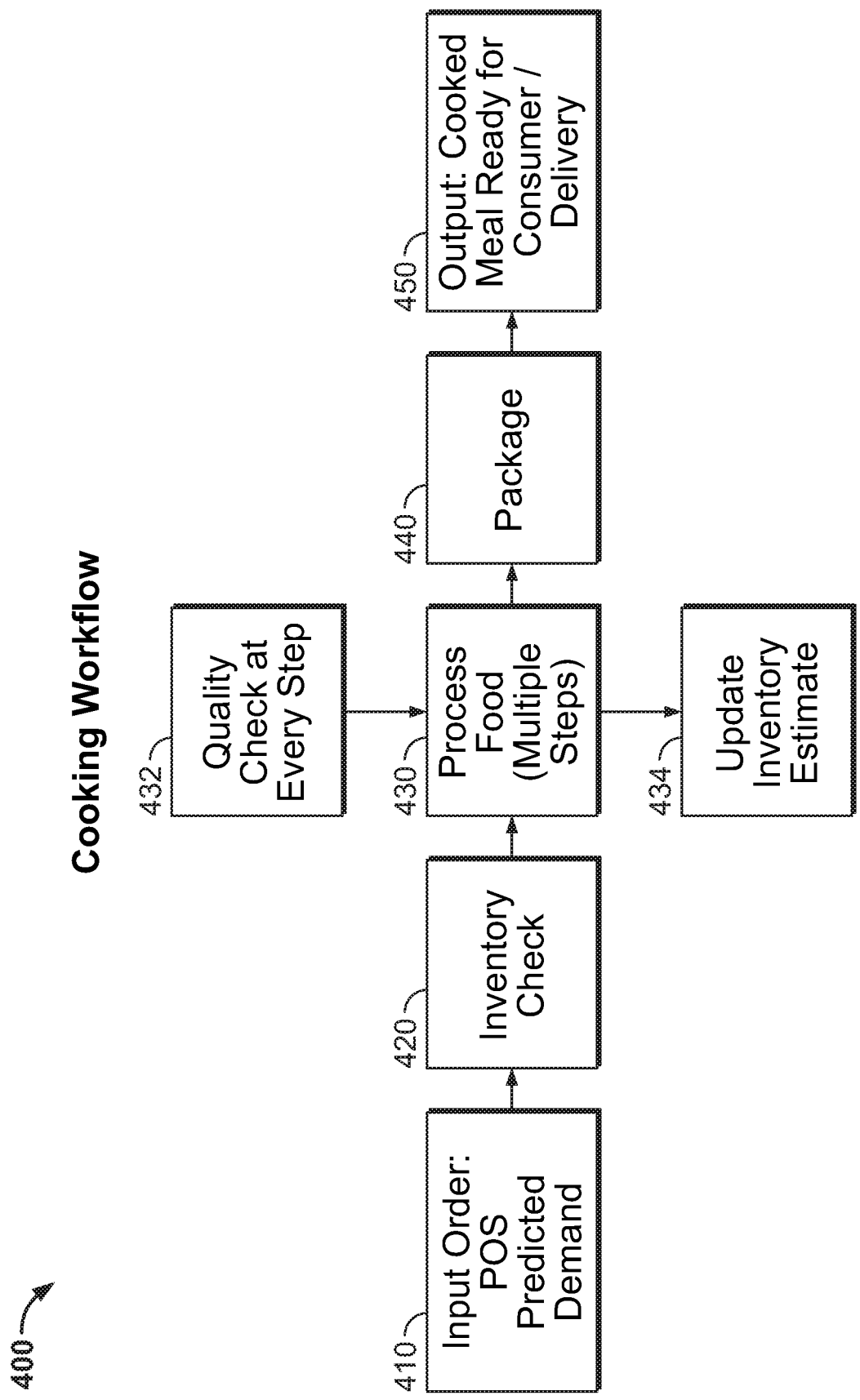
FIG. 6 is a flow chart of a process for a proving a cooked meal for consumer delivery or pickup in accordance with an embodiment of the invention.

FIG. 6 is a flowchart illustrating a cooking workflow 400 of a KIAB in accordance with one embodiment of the invention. Initially, an order is input (step 410). Step 410 may be implemented at a point of sale (POS) at a customer kiosk or app such as, e.g., customer interaction unit, described above. Demand may also be predicted for certain time of the day, or as otherwise computed by the processor and demand module.

Step 420 states to check inventory. The inventory may be automatically monitored using cameras and sensors aimed at the food items in storage, such as the smart storage discussed above.

Step 430 states to process food. For example, a pizza may be a) assembled, b) placed in the oven for cooking, c) removed and packaged using a serving vehicle as discussed above.

In embodiments, at each step of the food preparation process, quality is checked according to step 432. In an embodiment, quality is checked via a temperature sensor to monitor or test the doneness of a cooked food such as a fried chicken. Or, in another embodiment, a camera records an image of an assembled pizza and the processor analyzes whether the pizza is assembled properly and according to the menu order, confirming, e.g., whether the raw ingredients are present, uniformly distributed and in the proper amounts. Indeed, with each step of the cooking process, sensors can record each action and validate that the order is being assembled correctly. The order can be checked for ingredient accuracy, portion accuracy, and food safety.

Step 434 states that with each step completed, the system updates its understanding of the current level of ingredient inventory. If demand is higher than anticipated, the system can request additional ingredients.

Step 440 states to package the food. As described above, an example of packaging the food is to place the food in a box or bag or in a bowl for customer pickup or delivery (step 450).

Figure 7:
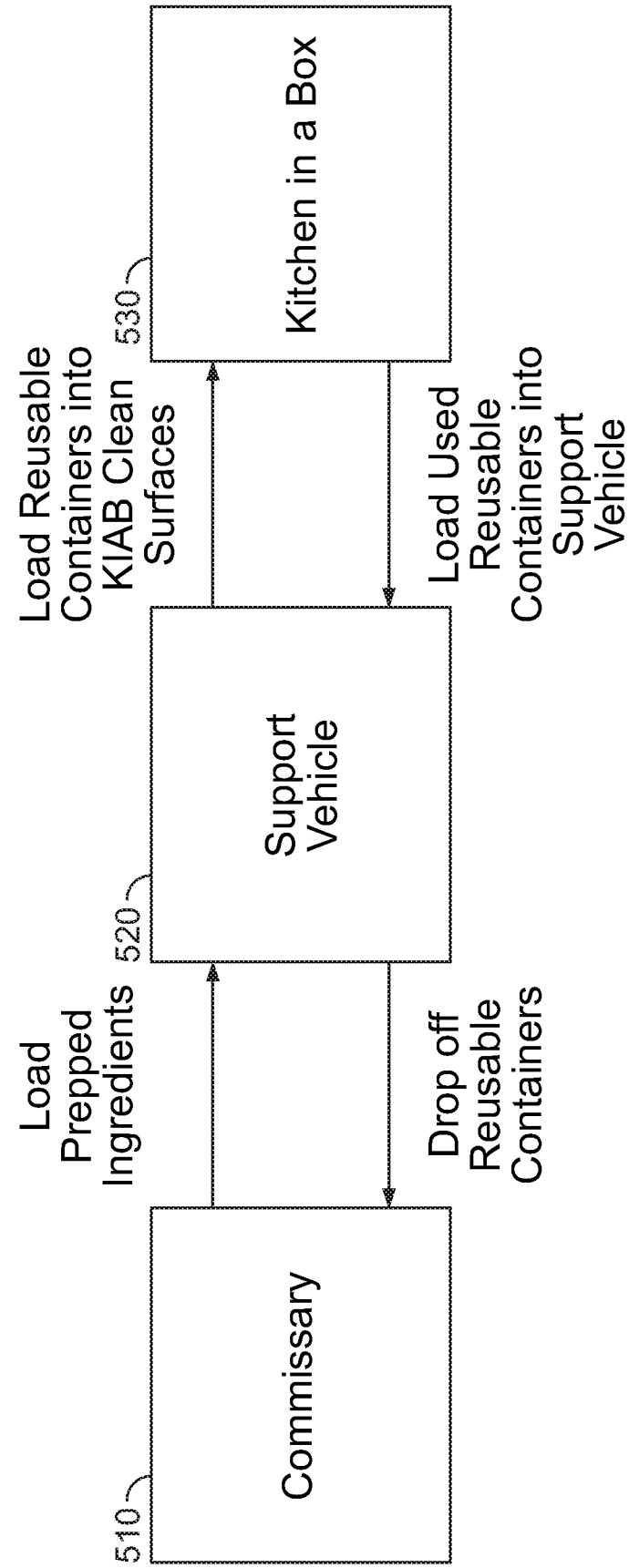
FIG. 7 is a flow chart of a process for supplying the robotic-automated kitchen in accordance with an embodiment of the invention.

With reference to FIG. 7, an operational model 500 is shown. The KIAB 530 is supplied by a food base station or commissary kitchen 510 where the ingredients can be prepped and loaded into the robot friendly packaging and loaded into the support vehicle 520 or, optionally, the KIAB itself.

In embodiments, the commissary 510 is an automated facility. In a commissary, food is prepped in large batches for efficiency. This can include, e.g., making dough and portioning it into dough balls, mixing sauces, cutting vegetables, etc. In some embodiments, these tasks can be performed by automated robotic systems as described in U.S. patent application Ser. No. 16/801,525, filed Feb. 26, 2020, and entitled "JAWLESS GRIPPER ENHANCED ROBOTIC KITCHEN SYSTEM FOR FOOD ASSEMBLY" and Provisional Patent Application No. 62/810,947, filed Feb. 26, 2019, entitled "Kitchen Food Prep, Pick and Place Workcell", incorporated herein by reference in its entirety.

The amount of ingredients prepped and sent out to each KIAB is determined by a demand algorithm or model stored in memory and performed on the processer described above. In embodiments, the loading of the prepared food is done fully autonomously.

As indicated above, the KIAB can be a transportable prefabricated structure, capable of being deposited, delivered, or moved to various environments.

Figure 8:
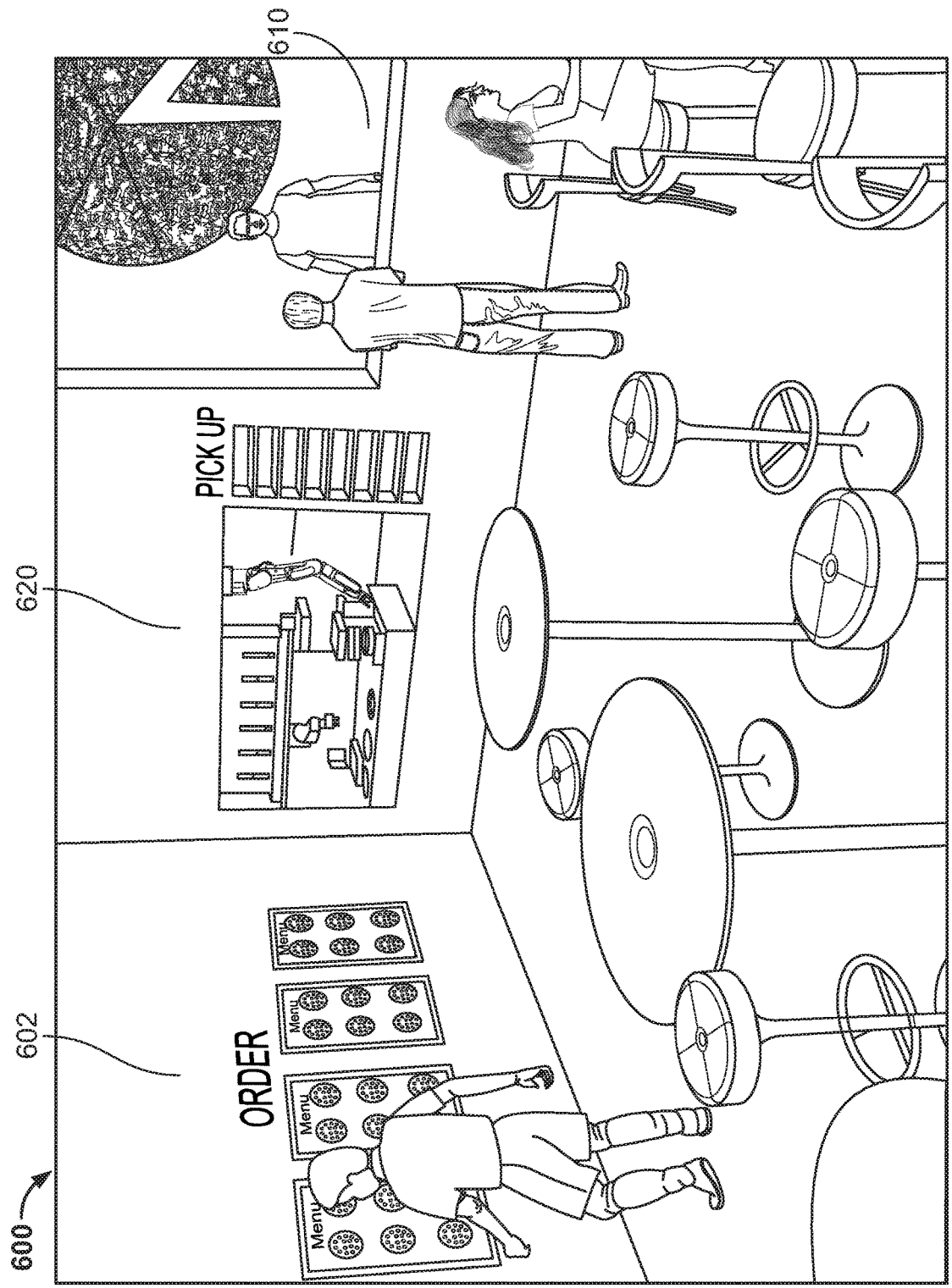
FIG. 8 is an illustration of a robotic-automated kitchen installed in a restaurant in accordance with an embodiment of the invention.

FIG. 8 illustrates a KIAB 620 installed in one restaurant-type environment.

Customers may order menu items from a POS order station 602 which automatically sends the order to the KIAB 620. The order station may be touch screen operable. The KIAB automatically prepares the menu order and places it in the "Pick Up" area when complete. Optionally, a clerk station 610 for staff is available to facilitate ordering and delivering the meals to the customers as well as to monitor the KIAB to ensure it is fully stocked, and otherwise operating as anticipated.

Alternate Embodiments

Figure 9:
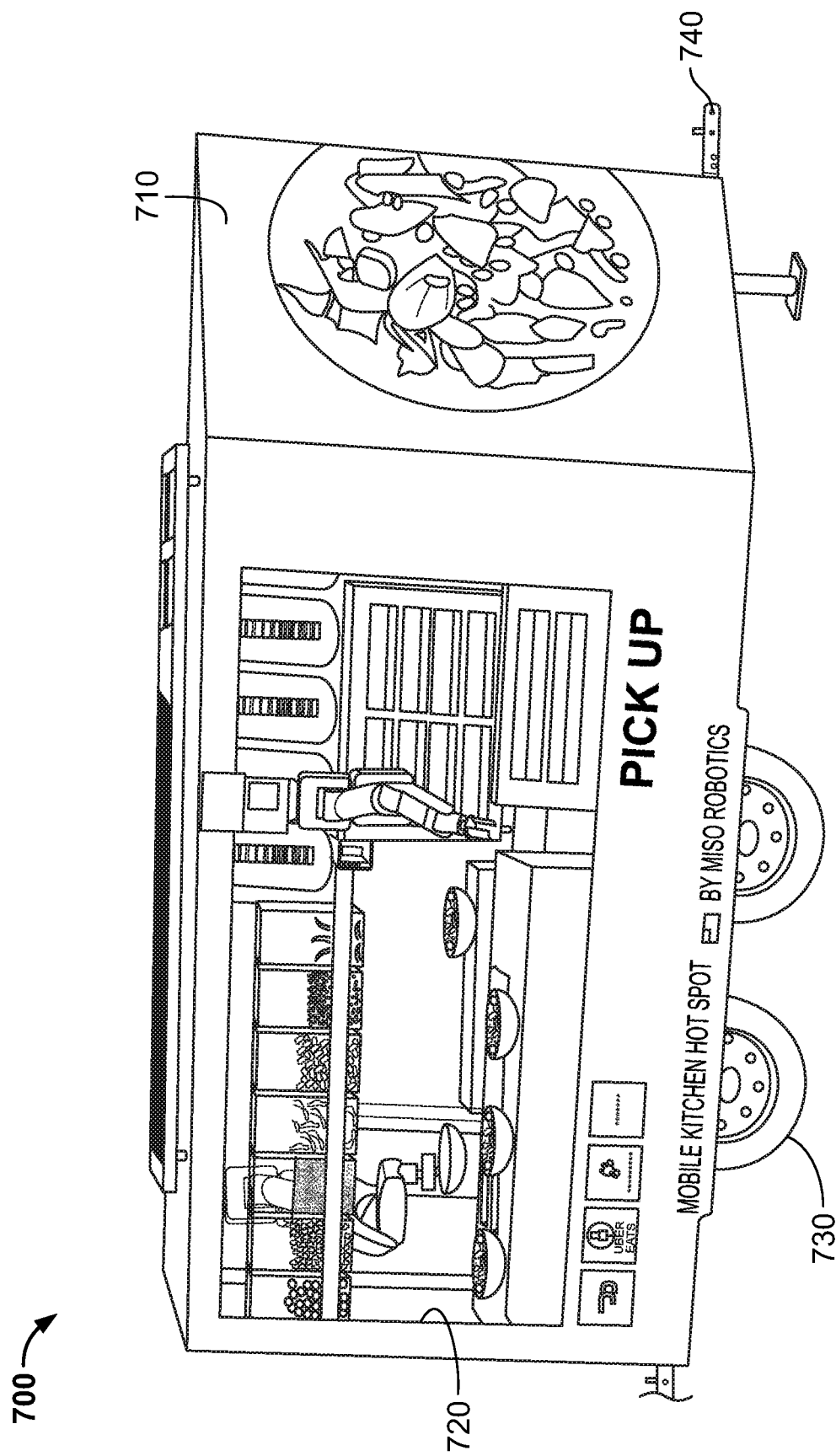
FIG. 9 illustrates a transportable robotic-automated kitchen in accordance with an embodiment of the present invention.
Figure 10:
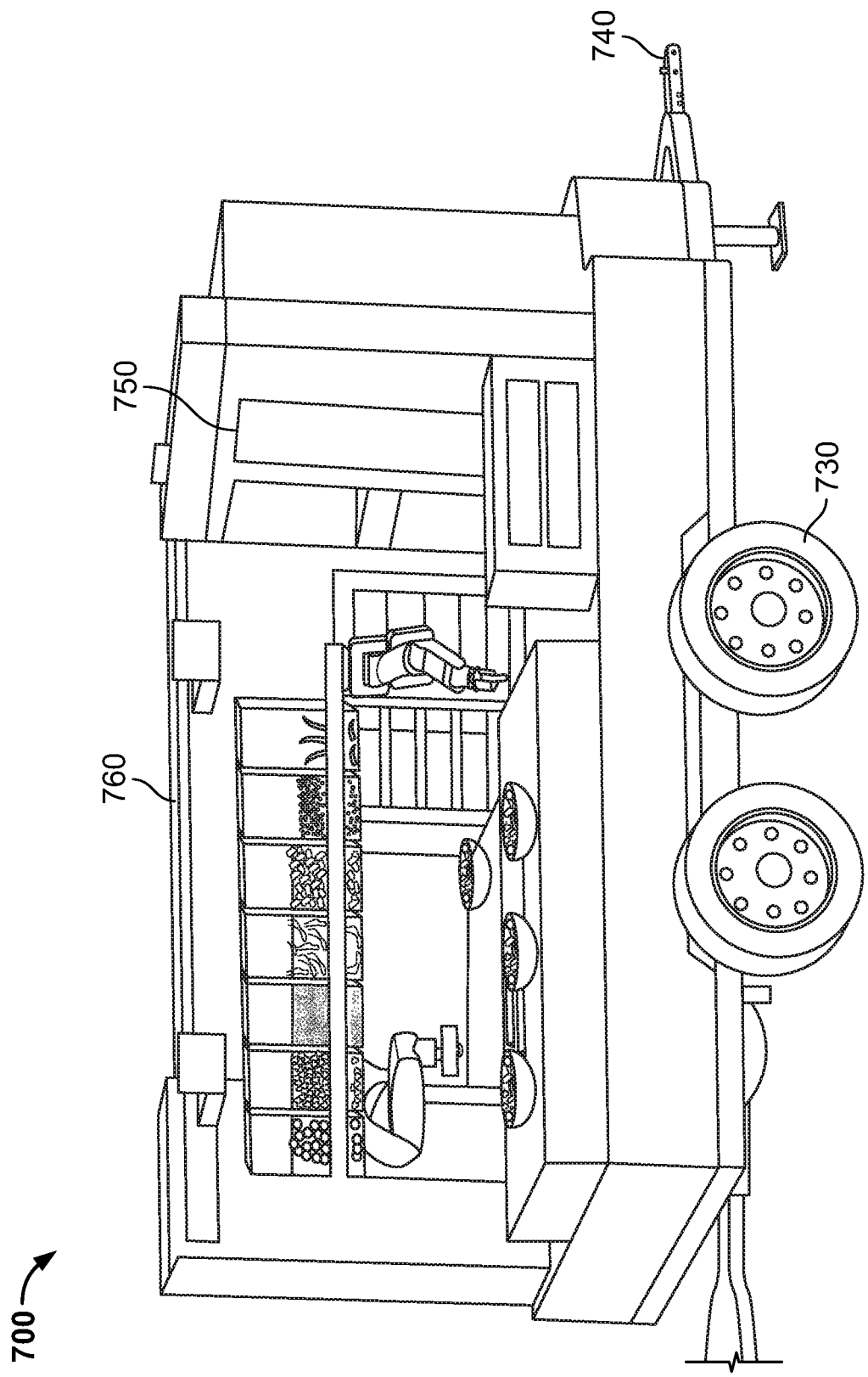
FIG. 10 illustrates the transportable robotic-automated kitchen shown in FIG. 9 with the exterior removed.

FIGS. 9-10 illustrate another embodiment of a KIAB 700 in accordance with the present invention including a streamlined (aerodynamically/angled/pointed) prefabricated enclosure 710, closable window 720, wheels 730, and a trailer hitch 740. FIG. 10 illustrates the KIAB shown in FIG. 9 with the enclosure removed for clarity to show smart food storage 750 and guide 760 as described above. The configuration shown in FIGS. 9-10 can be towed to a desired location. The location may be determined based on anticipated demand computed automatically and in real time.

In embodiments, and prior to transporting the KIAB to another location, the robotic arm is moved into a storage or tow configuration in which the arm itself is locked in a safe position during transport. An example of a desired safe position is, without limitation, one side of the enclosure. The arm may be straightened or closed to a resting (namely, a gravity neutral) position depending on whether the robotic arm is mounted to the ceiling or floor, respectively. Additionally, custom fasteners, clips and electronic programmable locks can be incorporated into the KIAB, and optionally actuatable by the processor, to hold down all moving articles such as for example the equipment, utensils, appliances, storage units, bins, and prep area tables during transport. To this end, the processor is operable with a storage or tow module which includes a set of instructions to actuate the hold-downs to affix the various components in place during transport, as well as place the robotic arm(s) in a safe position for transport.

In embodiments in which the KIAB is towable, the KIAB may include a tow package with brake lights, connector for the lights, as well as a parking brake.

Additionally, if larger food cooking throughput is needed at a particular location, more than one KIAB can be deployed to a given area. The locations to deploy the KIAB are determined by demand modeling as described above. In some embodiments, the KIAB is mobile and can move to higher demand areas throughout the day. Optionally, the KIAB includes a locator unit to provide real time location or position information of the KIAB.

Manufacture & Fabrication

In embodiments, the prefabricated enclosure is a 6' wide by 6' tall by 10' long frame (e.g., steel) covered with sheet metal or fiberglass panels. In a particular embodiment, a KIAB is sized to hold enough ingredients (and serving vehicles) for one meal rush period which is around 200 meals per rush period.

The KIAB is built with standard interfaces for power, gas, plumbing, and ventilation utilities. In mobile configurations, where a gas line is not available, the KIAB can have storage for enough gas for 1-2 days of cooking. In an embodiment, the length of the KIAB ranges from 6-10 ft and its height ranges from 4 to 8 ft.

Although the KIAB has great advantages in reducing contamination and cleanability due to the limited number of exposed moving components (making the KIAB easier to clean than traditional automated systems), embodiments of the invention include cleaning units and processes. In embodiments, the KIAB can include a water pumping system to assist in the cleaning process. Additionally, in some embodiments, the KIAB is adapted to clean itself. A cleaning module is run on the processor instructing the robotic arm to manipulate a cleaning tool (e.g., a spray nozzle) to directly aim cleaning solution at hard to reach areas. Preferably, the surfaces of the equipment are sloped, directing water to a target area including a drain. As such, the KIAB can be self-draining and has an arrangement of surfaces that does not lead to any pooling of liquid on the surfaces, interfaces, and even hard to reach areas.

The invention claimed is:

1. A raw food dispensing unit assembly for use in a kitchen environment or with a kitchen in a box (KIAB) comprising:
   a ramp sloping downward towards a target surface,
   a hopper for holding the raw food, arranged above the ramp and operable to dispense the raw food onto the ramp,
   a vibrating motor in contact with the ramp for moving the raw food on the ramp towards the target surface, and
   at least one sensor coupled to the ramp to measure a value of raw food on the ramp, wherein the sensor and ramp are arranged such that the ramp extends horizontally from the sensor, terminating in a distal free end, and the sensor measures the value of raw food on the ramp and independent of the weight of the hopper and the raw food contained within the hopper.

2. The assembly of claim 1, wherein the value is a mass of the raw food at a time ($M_{ti}$).

3. The assembly of claim 2, further comprising a mechanical actuator to control a flowrate at which the raw food is dispensed (Q).

4. The assembly of claim 3, further comprising a computer or processor operable to monitor the flowrate (Q), and to adjust the flowrate based on $M_n$.

5. The assembly of claim 4, wherein the flowrate (Q) is adjusted by adjusting at least one of the mechanical actuator and vibrating motor.

6. The assembly of claim 5, wherein the vibrating motor is operable to shake the ramp.

7. The assembly of claim 4, further comprising a rotatable drum within the hopper, and wherein the mechanical actuator comprises a drive motor for rotating the drum in the hopper to dispense the raw food.

8. The assembly of claim 4, wherein the computer or processor is operable to adjust the flowrate (Q) according to a recipe for a pizza.

9. The assembly of claim 1, wherein the at least one sensor comprises a load cell.

10. The assembly of claim 9, further comprising a support to which a proximal fixed end of the ramp is mounted via the load cell.

11. The assembly of claim 1, wherein the ramp has a flat surface.

12. A raw food dispensing unit assembly for use in a kitchen environment or with a kitchen in a box (KIAB) comprising:
 a ramp sloping downward towards a target surface,
 a hopper for holding the raw food, arranged above the ramp and operable to drop the raw food onto the ramp,
 a vibrating motor in contact with the ramp for moving the raw food on the ramp downward towards the target surface, and
 a sensor coupled to the ramp to measure a value of raw food on the ramp, wherein the sensor and ramp cooperate together such that the sensor measures the value of raw food independent of the hopper and the raw food contained therein.

* * * * *